United States Patent
Komaro et al.

(10) Patent No.: US 9,310,013 B2
(45) Date of Patent: Apr. 12, 2016

(54) CABLE FASTENING DEVICE

(75) Inventors: Raimo A. Komaro, Rauma (FI); Kim Komaro, Rauma (FI)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 12/910,317

(22) Filed: Oct. 22, 2010

(65) Prior Publication Data

US 2011/0108699 A1    May 12, 2011

(30) Foreign Application Priority Data

Oct. 23, 2009    (FI) .................................. 20090385 U

(51) Int. Cl.

| | |
|---|---|
| F16L 3/08 | (2006.01) |
| F16L 55/035 | (2006.01) |
| F16G 11/00 | (2006.01) |
| H02G 3/00 | (2006.01) |
| H02G 3/30 | (2006.01) |
| F16L 3/00 | (2006.01) |
| F16L 11/26 | (2006.01) |
| F16L 55/033 | (2006.01) |
| H02G 7/12 | (2006.01) |

(Continued)

(52) U.S. Cl.
CPC .............. *F16L 55/035* (2013.01); *F16G 11/00* (2013.01); *F16L 3/00* (2013.01); *F16L 3/08* (2013.01); *F16L 3/127* (2013.01); *F16L 11/26* (2013.01); *F16L 55/0336* (2013.01); *H02G 3/00* (2013.01); *H02G 3/26* (2013.01); *H02G 3/266* (2013.01); *H02G 3/30* (2013.01); *H02G 3/32* (2013.01); *H02G 7/125* (2013.01); *H02G 7/14* (2013.01)

(58) Field of Classification Search
CPC ............ F16G 11/00; H02G 3/00; H02G 3/26; H02G 3/30; H02G 7/125; H02G 7/14; H02G 7/266; F16L 3/00; F16L 3/08; F16L 11/26; F16L 55/0336; F16L 55/035
USPC ........... 248/74.3, 74.5, 74.4, 60, 63, 73, 74.1, 248/65; 24/16 R, 16 PB, 339, 21, 28
See application file for complete search history.

(56) References Cited

U.S. PATENT DOCUMENTS 3,098,272 A * 7/1963 Frye .............................. 24/67 R
3,173,638 A * 3/1965 Neale, Sr. ....................... 248/61

(Continued)

FOREIGN PATENT DOCUMENTS

| DE | 7312929 U | 6/1973 |
|---|---|---|
| DE | 7612444 U1 | 8/1976 |

(Continued)

OTHER PUBLICATIONS

Extended European Search Report issued Feb. 1, 2011, in connection with EP App. No. 10188446.8.

*Primary Examiner* — Terrell McKinnon
*Assistant Examiner* — Eret McNichols
(74) *Attorney, Agent, or Firm* — Levenfeld Pearlstein, LLC

(57) ABSTRACT

A cable fastening device comprising at least one connecting piece for fastening a cable to a fastening surface, and at least one binding lug protruding out of the outer surface of the connecting piece, by intermediation of which binding lug one or several cables are fastened to the fastening device, wherein the fastening device comprises a vibration attenuating material layer arranged in between the connecting piece and the fastening surface for the fastening device.

7 Claims, 1 Drawing Sheet

(51) Int. Cl.
    *H02G 7/14* (2006.01)
    *F16L 3/127* (2006.01)
    *H02G 3/32* (2006.01)

(56) References Cited

U.S. PATENT DOCUMENTS

| | | | | |
|---|---|---|---|---|
| 3,409,257 | A * | 11/1968 | Elm | 248/65 |
| 3,454,249 | A * | 7/1969 | Geisinger | 248/205.3 |
| 3,542,321 | A * | 11/1970 | Kahabka | 248/205.3 |
| 3,659,319 | A * | 5/1972 | Erickson | 24/304 |
| 3,672,615 | A * | 6/1972 | Fiorentino | 248/74.3 |
| 3,810,596 | A * | 5/1974 | Elm | 248/74.3 |
| 3,913,876 | A * | 10/1975 | McSherry | 248/68.1 |
| 4,025,015 | A * | 5/1977 | Kolic | 248/205.3 |
| 4,141,528 | A | 2/1979 | Herb et al. | |
| 4,239,167 | A * | 12/1980 | Lane | 248/205.3 |
| 4,389,754 | A * | 6/1983 | Sohma | 24/16 PB |
| 4,439,896 | A * | 4/1984 | Matsui | 24/16 PB |
| 4,457,053 | A * | 7/1984 | Niwa | 24/304 |
| 4,488,333 | A * | 12/1984 | Tracy | 24/198 |
| 4,623,102 | A * | 11/1986 | Hough, Jr. | 248/68.1 |
| 4,706,914 | A * | 11/1987 | Ground | 248/74.3 |
| 4,805,856 | A * | 2/1989 | Nicoli et al. | 248/74.3 |
| 5,039,366 | A * | 8/1991 | Strattman | 156/71 |
| 5,351,017 | A * | 9/1994 | Yano et al. | 333/12 |
| 5,390,883 | A * | 2/1995 | Songhurst | 248/74.3 |
| 5,484,066 | A * | 1/1996 | Luisi | 211/69.8 |
| 5,564,672 | A * | 10/1996 | Matson | 248/74.3 |
| 5,587,555 | A * | 12/1996 | Rinderer | 174/503 |
| 5,692,426 | A * | 12/1997 | Alexander | 83/466 |
| 5,820,090 | A * | 10/1998 | Nickels | 248/213.2 |
| 6,105,907 | A * | 8/2000 | Komsitsky | 248/71 |
| 6,256,891 | B1 * | 7/2001 | Van Camp et al. | 30/392 |
| 6,375,129 | B2 * | 4/2002 | Koziol | 248/68.1 |
| 6,427,952 | B2 * | 8/2002 | Caveney et al. | 248/68.1 |
| 6,513,764 | B2 * | 2/2003 | Koziol | 248/68.1 |
| 7,140,409 | B2 * | 11/2006 | Leberfinger et al. | 144/286.1 |
| 7,159,496 | B2 * | 1/2007 | Maes | 83/452 |
| 7,857,178 | B2 * | 12/2010 | Brown, Jr. | 224/483 |
| 8,367,182 | B2 * | 2/2013 | Rodrigues et al. | 428/100 |
| 8,550,259 | B1 * | 10/2013 | McCoy | 211/13.1 |
| 2001/0030266 | A1 * | 10/2001 | MacDonald et al. | 248/65 |
| 2003/0080261 | A1 * | 5/2003 | Winton, III | 248/74.3 |
| 2006/0081744 | A1 * | 4/2006 | Konold | 248/231.51 |
| 2008/0078890 | A1 * | 4/2008 | Nelson et al. | 248/73 |
| 2008/0148535 | A1 * | 6/2008 | Santin et al. | 24/470 |
| 2008/0185183 | A1 * | 8/2008 | Chen | 174/651 |
| 2009/0117322 | A1 * | 5/2009 | Larsen et al. | 428/137 |
| 2009/0127407 | A1 | 5/2009 | Pothanikat | |
| 2009/0179361 | A1 * | 7/2009 | Vito et al. | 267/140.11 |
| 2010/0096511 | A1 * | 4/2010 | Olver | 248/65 |
| 2013/0025929 | A1 * | 1/2013 | Dower et al. | 174/502 |
| 2014/0060891 | A1 * | 3/2014 | Deshaies et al. | 174/163 R |

FOREIGN PATENT DOCUMENTS

DE        8902948 U1    6/1989
GB        2504766 A *    2/2014

* cited by examiner

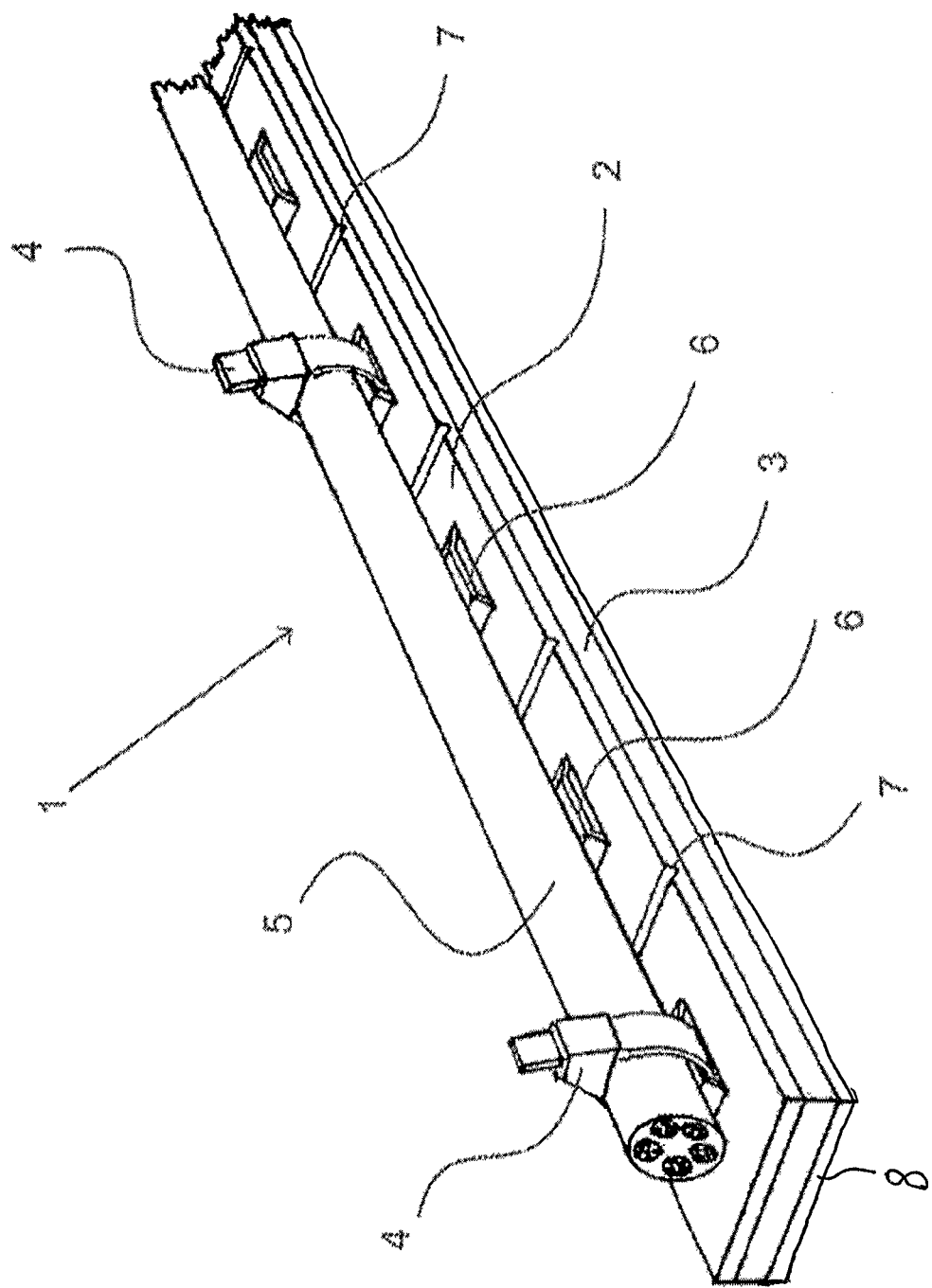

CABLE FASTENING DEVICE

BACKGROUND OF THE INVENTION

The invention relates to a cable fastening device used for fastening cables, pipes etc. More particularly, the invention relates to a fastening device, by means of which cables, pipes etc. can be fastened to different surfaces, particularly in demanding usage environments.

Several different solutions are known for fastening cables, wires, pipes etc. However, the majority of known solutions is not suitable to be used in demanding usage conditions, for example in the engine rooms of ships, where said fastening arrangements must reliably endure even remarkable vibrations.

Generally the fastening of cables and the like in these demanding targets is realized so that first there are provided fastening lugs for the cables, for instance by welding separate lugs in place, whereafter the cables are fastened to said lugs. In this way, a solid fastening arrangement is obtained, but its preparation is expensive and takes a long time, and it is not very easily modified.

An alternative for the above described method for fastening lugs is to attach the cable fastening pieces by adhesion or by means of a stick-on surface. Now the fastening pieces can be flexibly fixed in place in connection with running the cables, in the locations that are considered most suitable. The problem with this solution is that the fastening pieces are easily detached owing to vibration.

In their simplest form, said known fastening pieces of cables are plastic plates that are attached in place by adhesion or by a stick-on surface, and the fastening of cables to said fastening pieces is realized by means of cable ties that are tied through holes provided in the plates.

SUMMARY OF THE INVENTION

In the arrangement according to the present invention, the fastening of cables and the like is realized by a fastening device that is formed of a connecting piece extending along with the cable; on the top surface of said connecting piece, there is formed one or several brackets or binding lugs protruding out of the top surface of the connecting piece. Said brackets or binding lugs form a loop on the top surface of the connecting piece, and the cable can be fastened to the fastening device through said loops for instance by means of a cable tie.

The cable fastening device according to the invention comprises a vibration attenuating material layer, which material layer is arranged in between the fastening surface and the connecting piece of the cable fastening device. This vibration attenuating material layer improves the grip of the cable fastening device on the fastening surface, and prevents, as an elastic material, the cable fastening device and particularly the connecting piece from being detached from the fastening surface. The vibration attenuating material layer is advantageously made of rubber.

Further, the cable fastening device according to the invention can be characterized by at least one connecting piece for fastening a cable to a fastening surface, at least one binding lug protruding out of the outer surface of the connecting piece, by intermediation of which binding lug one or several cables are fastened to the fastening device, and a vibration attenuating material layer arranged in between the connecting piece and the fastening surface for the fastening device.

BRIEF DESCRIPTION OF THE DRAWINGS

The invention is explained in more detail below by way of example, with reference to the appended drawing, which FIG. 1 illustrates a cable fastening device according to the invention.

DETAILED DESCRIPTION

A cable fastening device 1 illustrated in FIG. 1 comprises a connecting piece 2, a vibration attenuating material layer 3, and cable ties 4 for fastening the cable 5 to the cable fastening device.

On the top surface of the connecting piece 2 of the cable fastening device 1, there are provided brackets or binding lugs 6 forming loops that are open on the sides, and through said loops the cable 5 can be attached to the cable fastening device by means of cable ties, string or wire 4 in the way illustrated in the drawing. The connecting piece 2 is advantageously made of steel strip, in which case its design and 25 particularly the binding lugs 6 can be realized for example by die cutting.

On the top surface of the connecting piece 2, there are advantageously made cutting grooves 7 in the area located in between the binding lugs 6, and said cutting grooves extend from one edge of the connecting piece 2 to the other edge thereof, in a direction that is transversal to the lengthwise direction of the connecting piece. By means of said cutting grooves 7, the cable fastening device 1 can be cut to a suitable length for fastening it to various different fastening surfaces.

In the cable fastening device 1, a vibration attenuating material layer 3 is attached to the bottom surface of the connecting piece 2. Said elastic material layer 3 improves the fastening of the cable fastening device 1 and makes it stick better to the fastening surface; owing to its vibration attenuating qualities, it also prevents the connecting piece 2 from being detached. The vibration attenuating layer 3 is advantageously made of rubber or of a similar material.

The cable fastening device 1 is attached to the fastening surface by adhesion, by a stick-on surface or by means of double-sided adhesive tape 8.

In the arrangement according to the invention, the metallic connecting piece 2 makes it possible to adjust the design of the cable fastening device 1 to be suitable for example for curved surfaces.

In the embodiment of FIG. 1, the cable fastening device according to the invention is arranged to proceed uninterrupted along the surface to which the cable is attached by intermediation of the cable fastening device. Now the surface area of the bottom surface of the cable fastening device becomes large, which improves the fastening of the cable fastening device according to the invention to the fastening surface.

In its simplest form, a cable fastening device according to the invention can be realized by at least one connecting piece, so that only one binding lug extends from the top surface of said connecting piece, and an elastic material layer is arranged in between the connecting piece and the fastening surface of the fastening device. This kind of embodiment can advantageously be formed of the embodiment illustrated in FIG. 1 by first cutting the elastic material layer 3 for example with a carpet knife at the first cutting groove 7 and then by breaking the end piece loose by bending the head in the vertical direction, so that the end piece can be detached from the rest of the material. The fastening device that is formed in this way comprises only one binding lug, and it is suitable in size to be fastened even to small fastening surfaces in awkward locations.

The arrangement according to invention is not restricted to the fastening of cables only, but it may also be used for fastening other similar elements, such as pipes etc.

Likewise, the arrangement according to the invention is not restricted to the use of cable ties for fastening cables, pipes etc. to the cable fastening device, as is described in the example of the drawing, but said fastening can also be realized by other types of strings, wires or the like.

The invention claimed is:

1. A cable fastening device comprising:
    at least one connecting piece made of a metal strip, the connecting piece including at least one cutting groove in a top surface thereof in a direction transverse to a length of the connecting piece, the cutting groove being formed into at least a portion of a thickness of the connecting piece, extending from a first edge of the connecting piece to a second edge of the connecting piece, forming a weakened region;
    at least two separate and spaced apart binding lugs extending from the top surface of the at least one connecting piece, the binding lugs being formed separate from one another, each binding lug defining a first open side parallel to and facing the first edge of the connecting piece and a second open side parallel to and facing the second edge of the connecting piece, wherein the cutting groove is positioned between, spaced from and separating adjacent ones of the at least two binding lugs, the binding lugs being integrally formed with the top surface and defining an opening through the connecting piece extending from the top surface to a bottom surface of the connecting piece opposite the binding lugs;
    an elastic vibration attenuating material layer positioned on and attached to the bottom surface; and
    an adhesive applied on the elastic vibration attenuating material layer at a side opposite to the connecting piece for attaching the connecting piece and elastic vibration attenuating material layer to a fastening surface, the adhesive being a double-sided adhesive tape,
    wherein a length of the connecting piece can be adjusted by separating a portion of the connecting piece from another portion of the connecting piece along the cutting groove, and
    wherein separation of the at least two binding lugs from one another along the groove maintains the adjacent binding lugs intact and unaffected.

2. The cable fastening device according to claim 1, wherein the at least two binding lugs are positioned along a center line of the at least one connecting piece.

3. The cable fastening device of claim 2, wherein the center line extends in a length direction of the at least two binding lugs such that the center line does not intersect respective first and second open sides of the at least two binding lugs.

4. The cable fastening device of claim 3, further comprising a cable tie extending through the first open side and the second open side of at least one of the binding lugs so as to extend between the connecting piece and the binding lug, the cable tie configured to secure a cable against an exterior surface of the binding lug.

5. The cable fastening device according to claim 1, wherein a cable is coupled to at least one of the binding lugs of the at least one connecting piece by a string or wire.

6. The cable fastening device according to claim 1, wherein a cable is coupled to at least one of the binding lugs of the at least one connecting piece by a steel strip.

7. A cable fastening device comprising:
    at least one connecting piece made of a metal strip, the connecting piece including at least one cutting groove in a top surface thereof in a direction transverse to a length of the connecting piece, the cutting groove being formed into at least a portion of a thickness of the connecting piece, extending from a first edge of the connecting piece to a second edge of the connecting piece, forming a weakened region;
    at least two separate and spaced apart binding lugs extending from the top surface of the at least one connecting piece, the binding lugs being formed separate from one another and centered on a longitudinal center line of the at least one connecting piece, the binding lugs being defined by open sides positioned parallel to and on opposing sides of the longitudinal centerline,
    wherein the cutting groove is positioned between and separating adjacent ones of the at least two binding lugs, the binding lugs being integrally formed with the top surface and defining an opening through the connecting piece extending from the to surface to a bottom surface of the connecting piece opposite the binding lugs;
    an elastic vibration attenuating material layer positioned on and attached to the bottom surface; and
    an adhesive applied on the elastic vibration attenuating material layer at a side opposite to the connecting piece for attaching the connecting piece and the elastic vibration attenuating material layer to a fastening surface, the adhesive being a double-sided adhesive tape, wherein a length of the connecting piece can be adjusted by separating a portion of the connecting piece from another portion of the connecting piece along the cutting groove, and
    wherein separation of the at least two binding lugs from one another along the groove maintains the adjacent binding lugs intact and unaffected.

* * * * *